INVENTOR.
James F. Ellis

INVENTOR.
James F. Ellis

United States Patent Office 3,275,887
Patented Sept. 27, 1966

3,275,887
SAFETY MAGNET CONTROLLER
James F. Ellis, R.F.D. 2, Anderson County, Tenn.
Filed Aug. 12, 1963, Ser. No. 301,333
20 Claims. (Cl. 317—13)

My invention relates to an electronic switching device, and more particularly to a device for controlling the electric current used to energize an electromagnet when said electromagnet is employed as a holding device for a safety element in a nuclear reactor, critical assembly, or the like.

Electromagnets are commonly used in nuclear reactors and critical assemblies for the purpose of holding a safety element, safety blade, or safety rod, in an elevated or cocked position. Should the nuclear reactor or critical assembly develop some characteristic action indicating that its condition is unsafe, it may be rapidly shut down by turning off the electric current to the electromagnet, thus de-energizing said electromagnet, and releasing the cocked or elevated safety device and allowing said safety device to quickly move into a position which would act to shut down the nuclear reactor or render a critical assembly subcritical.

Although electromagnets of the described type are usually supplied with electric current from direct current power supplies, circumstances sometimes may require that they be supplied with alternating currents. It is possible to adapt this invention to such use. Some embodiments of the invention are capable of self-rectification. Maximum performance capabilities, however, can best be realized by using a source of direct current to energize the electromagnet. It is necessary to include a suitable switching device in the winding circuit of such an electromagnet for controlling its action. Such a switching device must, upon receipt of a prearranged electrical signal, be capable of turning off the said magnet current in a very rapid manner.

Some of the more common problems encountered in this field are:

(1) The windings of the electromagnet may be considered as an inductive load. Upon the sudden opening of the supply circuit to this inductive load, voltage surges much greater than the supply voltage will be generated in the windings due to the rapid collapse of the magnetic flux. This rapid flux collapse is compounded by the separation of magnet and armature, as the electromagnet releases its mechanical load. These voltage surges present themselves at the point where the circuit is opened, and become a possible cause of circuit breakdown. Devices generally used to suppress these surges will also increase the time required for the electromagnet to release.

(2) Magnet current controllers, or magnet amplifiers, should be so arranged that in the event of some component failure the magnet current would turn off. No condition should exist which, upon some component failure, would prevent the magnet current from being turned off.

(3) These devices must be reliable, and their response to control signals must be predictable to a high degree of accuracy.

Two basic types of switching devices are:

(1) Electromechanical relays: While these have an advantage of reliability, they also have the disadvantage of a significant time delay and are prone to arc or spark at the contacts because of the self-induced voltage surge generated in the electromagnet's windings.

(2) Electronic switches (vacuum tubes, transistors, diodes, and the like): These have the advantage of great speed of action, and in many cases they are unaffected by the high voltage surges hereinbefore described.

Some electronic switches, or magnet amplifiers in present-day use, are essentially direct current amplifiers whose elements are operated in a non-linear mode and are so adjusted that when an incoming electrical signal from a nuclear radiation instrument reaches a prescribed level, the magnet current will be reduced sufficiently to cause the electromagnet to have insufficient magnetic flux to hold its load and the safety element to be released. These magnet amplifiers, while having advantages of speed and immunity to voltage surges, have a disadvantage in the form of an uncertainty of control signal level required to cause the electromagnet to release or "trip." This is because the magnet current does not remain constant for control signal levels below the tripping level, but varies in a non-linear relation to the incoming or control signal from radiation-measuring instruments. Some magnet amplifiers also have a disadvantage in that they require a bias supply as a source of negative potential for turning off the elements used as current switches. A failure of this bias supply would render the magnet amplifier unsafe.

Other systems may use, as a triggering element, a bistable circuit, an arrangement of a dual circuit in which one half the circuit will be on and the other half off. Such a circuit, upon receipt of a prescribed control signal, can be made to suddenly reverse its order of conduction. While such a device has the advantage of great predictability of its tripping action, it has the disadvantage in that should one particular half of the bistable circuit fail, the device would not allow the magnet current to turn off.

A primary object of my invention is to provide a safety-magnet controller which is as nearly fail-safe as the state of the art allows. For this purpose, the device is so designed that respective electronic components must be driven or forced into the "on" condition rather than biased off; thus a component failure would cause the unit to revert to the "off," or "safe" condition.

Another object of my invention is to provide a unit which can be made to respond to an incoming control signal from some other instrument in such a manner as to suddenly and completely turn off the magnet current once said control signal has reached a prescribed level, while retaining the advantages of vacuum tubes and/or semiconductors used as electronic switches. This device is so designed that there is no variation in magnet current caused by variations of the controlling signal until this controlling signal has reached the exact level designated as the tripping level.

Figure 1:
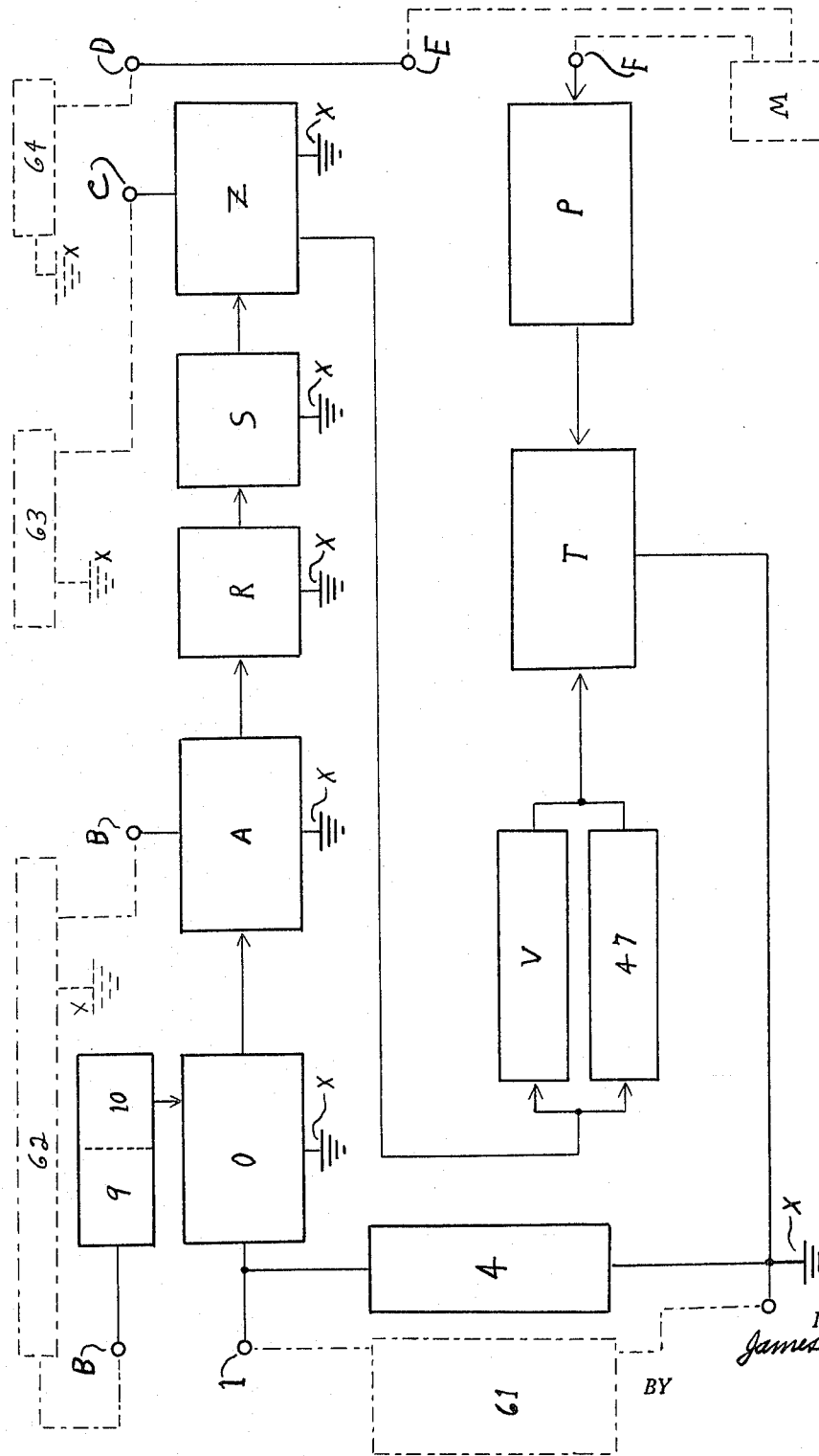
FIG. 1 is a block diagram showing an embodiment of the invention in basic form.

Referring to FIG. 1:

One terminal of a source of direct current electric power 64 is connected to terminal D. The opposite terminal of said current source is connected to the common ground X. The polarity of said connections depends on the particular circuit design. The said power supply 64 is the source of current for the electromagnet M. The two terminals of the electromagnet's windings are connected, one to terminal E, and the other to terminal F. Direct current supplies 62 and 63 for operating the control circuits are connected to terminals B and C. It is preferable, but not absolutely necessary, that the said current supplies 62 and 63 be isolated from each other.

The source of control signal or bias, in most cases some other instrument, is represented by 61 and is connected to terminal 1. The common ground X serves as common neutral for all external power and control sources.

Current in fed through manually operated switch 9, then through potentiometer 10 and supplied to oscillator O. With 10 properly adjusted and with predetermined bias conditions set up at 1, said oscillator O operates and drives limiting amplifier A. A in turn drives rectifier R which then feeds a direct-current signal through filter S, to impedance-matching unit Z, which may take the form of a voltage amplifier or a current amplifier, depending on the particular circuit requirements. Z in turn supplies a driving or controlling signal for the operation of electronic switch T. Said driving or controlling current must pass through a constant voltage drop or differential device V before reaching T. Capacitors 4 are connected in series with said driving or controlling current and in parallel with V.

With O running, signals are fed through the circuit and the said driving signal from Z turns T on. Current now flows from 64 through D, E, electromagnet M, F, parasitic suppressor P, and returns to X, through T. Upon a predetermined alteration of the potential at 1 by external instrument or instruments 61, O quickly ceases operation, no signal is fed through circuits A, R, S, Z, and parallel combination V and 47, electronic switch T is turned off, and the current flow through M ceases.

Should O be inactive due to improper potential conditions at 1, it may be operated momentarily and/or started by actuation of manual control 4 which momentarily establishes a potential at 1 suitable for oscillator operation. Potentiometer 10 adjusts the turn-on and turn-off characteristics of O. Momentary manual switch 9 is a means for turning O off for testing purposes.

O must either be running or not running. No intermediate condition is possible. A delivers full output as long as O is running. T is so arranged that it remains in the "off" condition in the absence of a signal, and therefore should any of the circuits fail to function, the current through M would remain in the "off" or safe condition.

Figure 2:
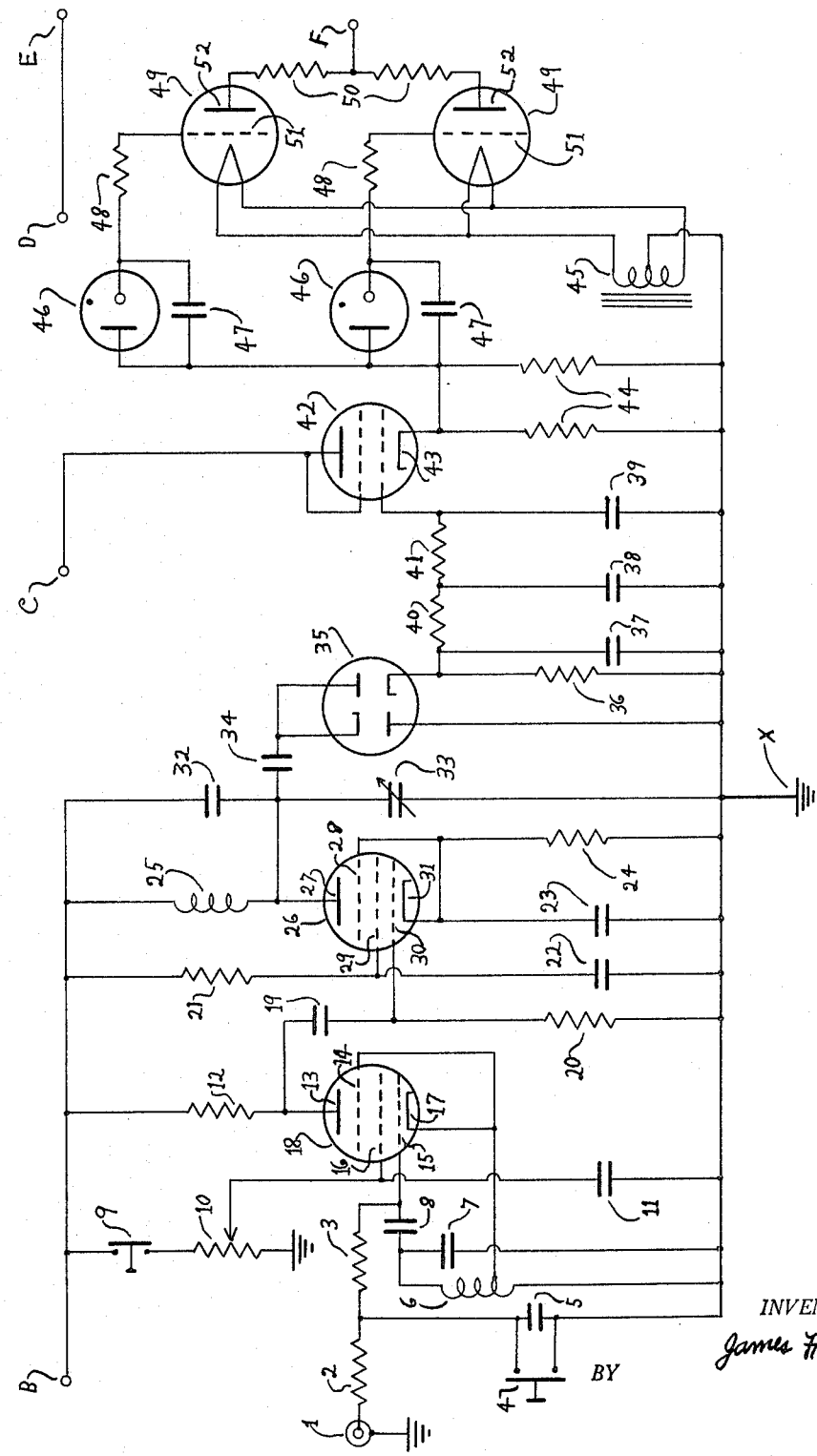
FIG. 2 is a schematic diagram of a typical circuit which is an embodiment of the invention.

Referring to FIG. 2:

Positive direct current is supplied to points B and C for circuit operation. Common ground X serves as common negative.

The oscillator comprised of inductor 6, capacitors 7 and 8, and pentode 18 has its only grid-leak return made through the connector 1 and an external controlling circuit. The oscillator will operate only when said external controlling circuit is connected, since with no connection made at 1, grid 15 becomes a part of an open circuit.

Switch 4 serves to momentarily close the grid circuit to start the oscillator for testing and/or operational purposes. Resistors 2 and 3 and capacitor 5 provide proper isolation between said oscillator and its external controlling circuit. Switch 9 serves to momentarily open the screen grid 16 circuit to stop the oscillator for testing purposes. Potentiometer 10 serves as a means for adjusting the operating conditions of said oscillator, and a means for determining the critical bias value or control-signal potential at which said oscillator will stop.

The output of said oscillator is taken from plate 13, with load resistor 12, fed through capacitor 19 to grid 30 of the following stage, with resistor 20 serving as grid leak. Resistor 21 and capacitor 22 maintain proper potential at screen grid 29. Condenser 23 and resistor 24 serve to properly bias cathode 31 and suppressor grid 28 of vacuum tube 26. Inductor 25, and capacitors 32 and 33 form a resonant circuit tuned to the same frequency as that of the oscillator. Vacuum tube 26 with its associated components serves as a limiting amplifier. The non-resonant interconnection between said oscillator and said limiting amplifier prevents any self-oscillation within said limiting amplifier and it must depend entirely upon said oscillator for its excitation.

By means of capacitor 34 the output of the limiting amplifier is fed to diode rectifier 35, and the resulting direct current is fed through filter network of resistors 40 and 41, and capacitors 37, 38, and 39 to the input of vacuum tube 42 operated as a cathode follower. Resistor 36 acts as ground reference return for the grid of said cathode follower. Current flow from 43 maintains a potential across parallel load resistors 44. Output current of 42 and its associated components is fed to grids 51, of switching tubes 49, and serves as driving current for said grids. Voltage reference tubes 46 maintain a fixed potential differential between cathode 43 and grid input resistors 48. Capacitors 47 provide means feeding a negative transient to grids 51 at the instant the device is turned off. Series resistors 48 are selected to allow proper current to be drawn by grids 51. Resistors 50 are for prevention or suppression of any possible parasitic oscillations in the output circuits of 49 or through output connection F.

A source of electric power is connected between terminal D and the common ground X. While it is preferable that this source be of direct current, with the positive terminal connected to D, it is not absolutely necessary, as this embodiment is capable of self-rectification. The windings of the electromagnet are connected, one with terminal E, and the other with terminal F. When the control oscillator is operating, a signal is fed through the circuit and tubes 49 are driven into conduction by current applied to their grids 51. Current now flows through D, E, the electromagnet, F, resistors 50, and vacuum tubes 49. Filament supply winding 45 of a transformer serves as ground return for this circuit.

When the control signal voltage at 1 reaches such a level as to deactivate the oscillator, the signal as amplified and fed to rectifier 35 ceases and the potential at the grid of 42 rapidly approaches zero. During this time the voltage differential across 46 is maintained by the charge on 47 which produces a sharp negative transient on grids 51. Said negative transient insures that tubes 49 will be definitely cut off even if large positive voltage transients should be present at plates 52. Said high voltage transients are likely to be generated upon sudden collapse of the magnetic fied within the windings of the electromagnet. Said charge of 47 gradually leaks off, its intended purpose having been accomplished.

It should be understood that this invention is not limited to the exact circuits shown in FIG. 2. While vacuum tubes may prove best for one application, semiconductors and solid state devices may prove best for others, and they may be used while still maintaining the basic principles and functions of this invention.

I claim:

1. An electronic circuit for controlling the current in the windings of an electromagnet, comprising an oscillator having a controlling input, means for connecting said controlling input to some external device yielding a primary controlling signal and thereby blocking said oscillator upon receiving a sufficient amplitude of the primary controlling signal, means deriving a controlling bias from an output of said oscillator, an electronic switching component of non-mechanical type having a controlling element, means delivering said controlling bias to said controlling element, said switching component also having current-carrying elements suitable for series connection between said windings and a source of electric power, said current-carrying elements having capability to withstand such voltage surges as may arise upon sudden release of the electromagnet, and said switching component being such that while said controlling element is excited with said controlling bias said current-carrying elements will conduct but that upon elimination of said controlling bias, as by controlled oscillator blockage, said current-carrying elements will cease to conduct.

2. An electronic circuit for controlling the current in the windings of an electromagnet, comprising an oscillator having a controlling input, means for connecting said controlling input to some external device yielding a primary controlling signal and thereby blocking said oscillator upon receiving a specified amplitude of the primary controlling signal, means amplifying and limiting the output of said oscillator to provide an ample oscillating current signal level at all times when said oscillator is running, means deriving a controlling bias from said oscillating current signal, a non-mechanical electronic switching component having a controlling element, means delivering said controlling bias to said controlling element, said switching component also having current-carrying elements suitable for series connection between said windings and a source of electric power, said current-carrying elements having capability to withstand such voltage surges as may arise upon sudden release of the electromagnet, and said switching component being such that said controlling element must be continually excited with said controlling bias in order to maintain conduction in said current-carrying elements so that upon termination of oscillations in said oscillator and subsequent removal of controlling bias, conduction through said current-carrying elements will cease.

3. An electronic circuit for controlling the current in the windings of an electromagnet, comprising a free-running oscillator having a controlling input, means for connecting said controlling input to some external device yielding a primary controlling signal and thereby blocking said oscillator upon receiving a designated amplitude of the primary controlling signal, means amplifying and limiting an output of said oscillator to provide an ample oscillating current signal level at all times when said oscillator is running, said means amplifying and limiting being coupled to said oscillator by non-resonant means so as to preclude the possibility that said means amplifying and limiting could of itself act as an oscillator, means deriving a controlling bias from said oscillating current signal, an electronic switching component of non-mechanical construction having a controlling element, means delivering said controlling bias to said controlling element, said switching component also having current-carrying elements suitable for series connection between said windings and a source of electric power, said current-carrying elements having capability to withstand such voltage surges as may arise upon sudden release of the electromagnet, and said switching component being such that said controlling element must be continually excited with said controlling bias in order to maintain conduction in said current-carrying elements so that upon termination of oscillations in said oscillator and subsequent removal of said controlling bias, conduction through said current-carrying elements will cease.

4. An electronic circuit for controlling the current in the windings of an electromagnet, comprising an oscillator having a controlling input, means for connecting said controlling input to some external device yielding a primary controlling signal and thereby blocking said oscillator upon receiving a designated amplitude of the primary controlling signal, means amplifying and limiting the output of said oscillator to provide ample alternating current signal level at all times when said oscillator is running, said means amplifying and limiting being coupled to said oscillator by non-resonant means so as to preclude the possibility that said means amplifying and limiting could of itself act as an oscillator, means deriving a controlling bias from said alternating current signal, means delivering said controlling bias to a controlling elements of a suitable non-mechanical electronic switching component, said switching component having current-carrying elements suitable for series connection between said windings and a source of electric power, said current-carrying elements having capability to withstand such voltage surges as may arise upon sudden release of the electromagnet, and said switching component being such that said controlling element must be continually excited with said controlling bias in order to maintain conduction through said current-carrying elements, so that upon termination of oscillation in said oscillator or the failure of an intermediate circuit component and subsequent removal of said controlling bias, current conduction through said current-carrying elements of said switching component will cease.

5. An electronic circuit for controlling the current in the windings of an electromagnet, comprising an oscillator having a controlling input, means for connecting said controlling input to some external device yielding a primary controlling signal and thereby blocking said oscillator when the primary controlling signal reaches a pre-determined amplitude, said means for connecting being so arranged as to make it necessary that said means for connecting be actually connected to the external device in order to complete the circuit and cause said oscillator to operate, means amplifying and limiting the output of said oscillator to provide an ample alternating current signal at all times when said oscillator is running, said means amplifying and limiting being coupled to said oscillator by non-resonant means so as to preclude the possibility that said means amplifying and limiting could of itself act as an oscillator, means deriving a controlling bias from said alternating current signal, means delivering said controlling bias to a controlling element of a suitable non-mechanical electronic switching component, said switching component having current-carrying elements suitable for series connection between said windings and a source of electric power, said current-carrying elements having capability to withstand such voltage surges as may arise upon sudden release of the electromagnet, and said switching component being such that said controlling element must be continually excited with said controlling bias in order to maintain conduction in said current-carrying elements, so that upon removal of said controlling bias, whether caused by controlled blockage of said oscillator or by the failure of some circuit component, current conduction through said current-carrying elements of said switching component will cease.

6. The invention defined in claim 5, with means attached for suppressing such parasitic oscillations as may be generated in the circuits of said electronic switching component.

7. An electronic circuit for controlling the current in the windings of an electromagnet, comprising a free-running oscillator having a controlling input, means for connecting said controlling input to some external device yielding a primary controlling signal and thereby blocking said oscillator when the primary controlling signal reaches a predetermined amplitude, said means for connecting being so arranged as to make it necessary that said means be actually connected to the external device in order to complete the circuit and cause said oscillator to operate, non-resonant means coupling said oscillator to a second stage, said second stage being suitable to amplify and to limit the output of said oscillator so as to produce an alternating current signal of adequate amplitude at all times when said oscillator is running, said means coupling being so arranged as to preclude the possibility that said second stage might of itself act as an oscillator, means rectifying said alternating current signal and deriving therefrom a controlling bias, a suitable non-mechanical electronic switching component having both a controlling element and current-carrying elements, means applying said controlling bias to said controlling element, said current-carrying elements being suitable for series connection between a source of electric power and said windings and having the ability to withstand such voltage surges as may arise upon sudden release of the electromagnet, and said switching component being such that said controlling element must be continually excited with said controlling bias in order to maintain conduction in said current-carrying elements so that upon removal of said controlling bias, whether caused by controlled oscillator blockage or by a component failure, conduction through said current-carrying elements will cease.

8. An electronic circuit for controlling the current in the windings of an electromagnet, comprising in combination, an oscillator having a controlling input, means for connecting said controlling input to some external device yielding a primary controlling signal and thereby blocking said oscillator when the primary controlling signal reaches a pre-determined amplitude, said means for connecting being so arranged as to make it necessary that said means be actually connected to the external device in order to complete the circuit and cause said oscillator to operate, non-resonant means coupling said oscillator to a limiting amplifier stage to produce an alternating current signal of adequate amplitude at all times when said oscillator is running, said means coupling being so arranged as to preclude the possibility that said limiting amplifier might of itself act as an oscillator, means rectifying said alternating current signal, means filtering the rectified signal so as to remove most of the frequency component of said oscillator while allowing rapid changes in said rectified signal amplitude to be passed on and in this manner to develop a controlling bias, a suitable electronic switching component of a non-mechanical variety having both a controlling element and current-carrying elements, means applying said controlling bias to said controlling element, said current-carrying elements being suitable for series connection between a source of electric power and said windings and having the ability to withstand such voltage surges as may arise upon sudden release of the electromagnet, and said switching component being such that said controlling element must be continually excited with said controlling bias in order to maintain said current-carrying elements in an "on" condition, so that upon removal of said controlling bias, whether caused by controlled oscillator blockage or by a component failure, said current-carrying elements will revert to an "off" condition.

9. An electronic circuit for controlling a direct current in an inductive load, comprising in combination, an oscillator having a controlling input, means for connecting said controlling input to some external circuit yielding a primary controlling signal and thereby blocking said oscillator when the primary controlling signal reaches a pre-determined amplitude, a limiting amplifier stage coupled to an output of said oscillator in such manner as to preclude the possibility that said limiting amplifier might of itself act as an oscillator, a rectifier coupled to the output of said limiting amplifier and yielding an output upon receiving oscillating energy from said limiting amplifier, a filtering circuit receiving the rectified output of said rectifier and removing therefrom most of the frequency component of said oscillator but passing on the true amplitude of said rectified output as well as any rapid changes thereof and thus forming a first controlling bias, means receiving said first controlling bias and yielding therefrom a second controlling bias less in voltage by a fixed amount from that of said first controlling bias so that said second controlling bias will reverse polarity upon sufficient reduction in amplitude of said first controlling bias, an electronic switching component of non-mechanical variety having both a controlling element and current-carrying elements, said second controlling bias being applied to said controlling element, said current-carrying elements being suitable for series connection between a source of direct current electric power and the said inductive load and having capability to withstand such voltage surges as may be generated upon sudden release of the inductive load, said switching component being such that said controlling element must be continually excited with said second controlling bias of a particular polarity in order to maintain said current-carrying elements in an "on" condition, and that upon reversal of polarity of said second controlling bias, as by controlled oscillator blockage and subsequent effects, said current-carrying elements will revert to and be held in an "off" condition.

10. An electronic circuit for controlling a current in the windings of an electromagnet, comprising an oscillator having a controlling input, means for connecting said controlling input to some external circuit yielding a primary controlling signal and thereby blocking said oscillator should said primary controlling signal exceed a designated amplitude, means receiving an output of said oscillator and developing therefrom a direct current controlling bias, an electronic switching component of non-mechanical variety having both a controlling element and current-carrying elements, said switching component being such that said controlling element must be excited with a bias of proper amplitude and polarity in order to maintain conduction in said current-carrying elements, said current-carrying elements being suitable for connection between said windings and a source of electric power and having capability to withstand such voltage surges as may arise upon sudden turn-off and release of the electromagnet, means coupling said controlling bias to said controlling element, a capacitor used in conjunction with said means coupling and arranged so that at a time of rapid reduction in amplitude of said controlling bias, as by controlled oscillator blockage and subsequent effects, said capacitor will deliver to said controlling element a voltage transient opposite in polarity to that of said controlling bias and will thereby insure that said current-carrying elements will be completely cut off at that instant.

11. An electronic circuit for controlling a current in the windings of an electromagnet, comprising an oscillator having a controlling input, means for connecting said controlling input to some external circuit yielding a primary controlling signal and thereby blocking said oscillator should said primary controlling signal exceed a pre-determined amplitude, means receiving an output of said oscillator and developing therefrom a controlling bias, an electronic switching component of non-mechanical variety having both a controlling element and current-carrying elements, said switching component being such that said controlling element must be excited with a bias of proper polarity and amplitude in order to maintain conduction in said current-carrying elements, said current-carrying elements being suitable for connection between said windings and a source of electric power and having capability to withstand such voltage surges as may arise upon sudden release of the electromagnet, means amplifying said controlling bias to a sufficient magnitude to excite said switching component to a state of maximum conduction, means coupling said controlling bias to said controlling element, said means coupling being so arranged that at a time of rapid reduction in amplitude of said controlling bias, as by controlled oscillator blockage and subsequent results, said means coupling will deliver to said controlling element a voltage transient opposite in polarity to that of said controlling bias and will thereby insure that said current-carrying elements will be completely cut off at that instant.

12. The circuit defined in claim 11, where said "means coupling" is a voltage reference tube in series with a resistor and in parallel with a condenser, and where said "means amplifying said controlling bias" is a cathode follower.

13. An electronic circuit for controlling a direct current in the windings of an electromagnet, comprising a free running oscillator of stable frequency having a controlling input, means for connecting said controlling input to some external circuit yielding a primary controlling signal and thereby blocking said oscillator when the primary controlling signal exceeds a pre-determined amplitude, a limiting amplifier stage coupled to an output of said oscillator in such manner as to preclude the possibility that said limiting amplifier might of itself act as an oscillator, a rectifier coupled to the output of said limiting amplifier and yielding an output upon receiving oscillating energy from said limiting amplifier, a filtering circuit receiving the rectified output of said rectifier and removing therefrom most of the frequency component of said oscillator but passing on the true amplitude of said rectified output as well as any rapid changes thereof and thus forming a first controlling bias, means amplifying the current of said first controlling bias and delivering an output to a means for establishment of a fixed voltage differential, said last-named means yielding a second controlling bias less in voltage by a fixed amount from that of said first controlling bias so that said second controlling bias will reverse polarity upon sufficient reduction in amplitude of said first controlling bias, capacitors connected in parallel with said last named means so as to pass on any electrical transients, electronic switching components of non-mechanical variety having both controlling elements and current-carrying elements, said second controlling bias being applied by suitable means to said controlling elements, said current-carrying elements being suitable for series connection between a source of direct current electric power and windings of the electromagnet and having capability to withstand such voltage surges as may arise upon sudden opening of the circuit and release of the electromagnet, said switching components being such that their controlling elements must be continually excited with said second controlling bias of a particular polarity in order to maintain their said current-carrying elements in a conducting condition, said current-carrying elements therefore being conducting when said oscillator is running, and that upon reversal of polarity of said second controlling bias, as by controlled oscillator blockage and subsequent effects, said current-carrying elements will be non-conducting.

14. The circuit defined in claim 13 with provision to so adjust the operating parameters of said oscillator that the primary controlling signal level required for its blockage may be selected.

15. The circuit defined in claim 13 with provision for manually blocking said oscillator for testing purposes.

16. The circuit defined in claim 13 with provision for manually un-blocking said oscillator for testing purposes.

17. An electronic circuit for controlling the current in the windings of an electromagnet, comprising in combination, an oscillator consisting of an amplifying component and a resonant circuit with regenerative feed-back and an output and a controlling input suitable for connection to an external circuit yielding a primary controlling signal, said oscillator being thereby blocked if said primary controlling signal should exceed a given amplitude, a limiting amplifier stage coupled to said oscillator output, a stage for rectification of said limiting amplifier output, all the hereinbefore named units being so arranged as to guard against the possibility that said limiting amplifier might by some unwanted stray coupling to some nearby unit act as an oscillator and thereby override said oscillator, a stage filtering the rectified output of said rectifier, a current amplifier receiving said rectified output and yielding a second output in the form of a controlling bias, means producing a fixed voltage drop, said last named means receiving said controlling bias and yielding a second controlling bias, said second controlling bias being less than said first controlling bias by the amount of voltage drop produced by said last-named means, non-mechanical electronic switching components having controlling elements and switching elements, means coupling said second controlling bias to said controlling elements and thereby causing said switching elements to be in a conducting condition while said oscillator is running, and said means producing a fixed voltage drop causing said second controlling bias to reverse polarity when said first controlling bias is reduced to a low value and thereby causing said switching elements to revert to a non-conducting condition when said oscillator is blocked.

18. The circuit defined in claim 17 where said electronic switching components are vacuum tubes.

19. An electronic circuit for controlling the current in an inductive load comprising a primary controlling stage and a secondary controlling stage, said primary controlling stage having two possible states only one of which may exist at a given time, said states being an excited state and a relaxed state, means for receiving an input signal and initiating said primary controlling stage into said excited state by a first input signal value and initiating said primary controlling stage into said relaxed state by a second input signal value, means coupling said primary controlling stage to said secondary controlling stage, said secondary controlling stage being non-mechanical and having terminals suitable for connection between a source of electric power and the inductive load, said secondary controlling stage having two possible conditions only one of which may exist at a given time, said conditions being those of conducting and non-conducting, said secondary controlling stage being able to withstand such voltage surges as may arise upon sudden release of the inductive load, said means coupling feeding excitation to said secondary controlling stage in response to said states of said primary controlling stage, said secondary controlling stage being in said conducting condition when excited, and said secondary controlling stage being in said non-conducting condition when not excited.

20. An electronic circuit for controlling the current in the windings of an electromagnet comprising a primary controlling stage and a secondary controlling stage, said primary controlling stage having two possible states only one of which may exist at a given time, said states being an excited state and a relaxed state, means for receiving an input signal and causing said primary controlling stage to be initiated into said excited state by a first input signal value and into said relaxed state by a second input signal value exceeding some designated minimum, said input signal values existing only one at a given time, means for coupling said primary controlling stage to said secondary controlling stage and feeding excitation thereto when said primary controlling stage is excited, said secondary controlling stage being non-mechanical and having terminals suitable for connection in series between a source of electric power and the windings of the electromagnet, said secondary controlling stage having two possible conditions, said conditions being those of conducting and non-conducting, said conditions existing only one at a given time, said secondary controlling stage being able to withstand such voltage surges as may arise upon sudden release of the electromagnet, said secondary controlling stage being in said conducting condition when excited, and said secondary controlling stage being in said non-conducting condition when not excited.

References Cited by the Examiner

UNITED STATES PATENTS

| | | | |
|---|---|---|---|
| 2,907,931 | 10/1959 | Moore | 317—146 X |
| 2,972,116 | 1/1961 | Lowe | 317—146 X |
| 2,983,852 | 5/1961 | Gray | 317—146 X |
| 3,005,110 | 10/1961 | Elam | 317—146 X |
| 3,042,839 | 7/1962 | Hermes | 317—146 |
| 3,086,109 | 4/1963 | Kaehms | 317—146 X |
| 3,147,407 | 9/1964 | Warner et al. | 317—146 |

MILTON O. HIRSHFIELD, *Primary Examiner.*

SAMUEL BERNSTEIN, *Examiner.*

R. V. LUPO, *Assistant Examiner.*